(12) United States Patent
Yebka et al.

(10) Patent No.: US 9,197,073 B2
(45) Date of Patent: Nov. 24, 2015

(54) ACTIVE SWELLING REDUCTION FOR POUCH CELLS

(71) Applicant: Lenovo (Singapore) Pte. Ltd., Singpaore (SG)

(72) Inventors: Bouziane Yebka, Apex, NC (US); Philip John Jakes, Durham, NC (US); Tin-Lup Wong, Chapel Hill, NC (US)

(*) Notice: Subject to any disclaimer, the term of this patent is extended or adjusted under 35 U.S.C. 154(b) by 323 days.

(21) Appl. No.: 13/744,765

(22) Filed: Jan. 18, 2013

(65) Prior Publication Data

US 2014/0203784 A1    Jul. 24, 2014

(51) Int. Cl.
*H02J 7/00*    (2006.01)

(52) U.S. Cl.
CPC ........................ *H02J 7/00* (2013.01)

(58) Field of Classification Search
CPC ..... H02J 7/0063; H02J 7/0011; H02J 7/0006; H02J 7/0026; H02J 7/0031; H02J 7/0042; H02J 7/00; H02J 7/0029; H02J 7/007; H02J 7/0065; H02J 7/0077; H02J 7/025; H02J 7/35; H01M 4/06; H02H 7/18

USPC .......................... 716/132–138; 320/132–138
See application file for complete search history.

(56) References Cited

U.S. PATENT DOCUMENTS

| | | | |
|---|---|---|---|
| 2002/0001745 A1* | 1/2002 | Gartstein et al. | 429/61 |
| 2003/0038610 A1* | 2/2003 | Munshi et al. | 320/101 |
| 2006/0103357 A1* | 5/2006 | Johnson et al. | 320/150 |

* cited by examiner

*Primary Examiner* — Binh Tat
(74) *Attorney, Agent, or Firm* — Ference & Associates LLC

(57) ABSTRACT

An aspect provides a method, including: normally discharging one or more battery cells housed in a flexible exterior material; determining one or more of the one or more battery cells has less than a predetermined voltage level; and actively discharging the one or more battery cells determined to have less than the predetermined voltage. Other aspects are described and claimed.

19 Claims, 8 Drawing Sheets

ACTIVE SWELLING REDUCTION FOR POUCH CELLS

BACKGROUND

Information handling devices ("devices"), for example laptop computers, tablet computing devices, smart phones, e-readers, mp3 players and the like, use rechargeable battery packs to supply power. For example, devices commonly include a rechargeable battery pack that is charged by a commercial power source (wall outlet) and powers the device when disconnected therefrom.

Increasingly devices utilize pouch type cell packs in addition to or in lieu of conventional (hard-shell) battery packs. A pouch type cell (or simply pouch cell) is any cell having a soft or flexible exterior material for containing the battery cell(s). Advantages of pouch cells include cost savings and size reduction. Pouch-type cells or packs are increasingly common due to the growing popularity of small form factors and consumer demand for "thin" or "slim" devices.

BRIEF SUMMARY

In summary, one aspect provides a method, comprising: normally discharging one or more battery cells housed in a flexible exterior material; determining one or more of the one or more battery cells has less than a predetermined voltage level; and actively discharging the one or more battery cells determined to have less than the predetermined voltage.

Another aspect provides an information handling device, comprising: a flexible exterior material containing one or more battery cells; one or more components deriving power from the one or more battery cells; one or more processors; and a memory operatively coupled to the one or more processors that stores instructions executable by the one or more processors to perform acts comprising: normally discharging the one or more battery cells; determining one or more of the one or more battery cells have less than a predetermined voltage level; and actively discharging the one or more battery cells determined to have less than the predetermined voltage.

A further aspect provides a program product, comprising: a storage medium having computer program code embodied therewith, the computer program code comprising: computer program code configured to normally discharge one or more battery cells housed in a flexible exterior material; computer program code configured to determine one or more of the one or more battery cells have less than a predetermined voltage level; and computer program code configured to actively discharge the one or more battery cells determined to have less than the predetermined voltage.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
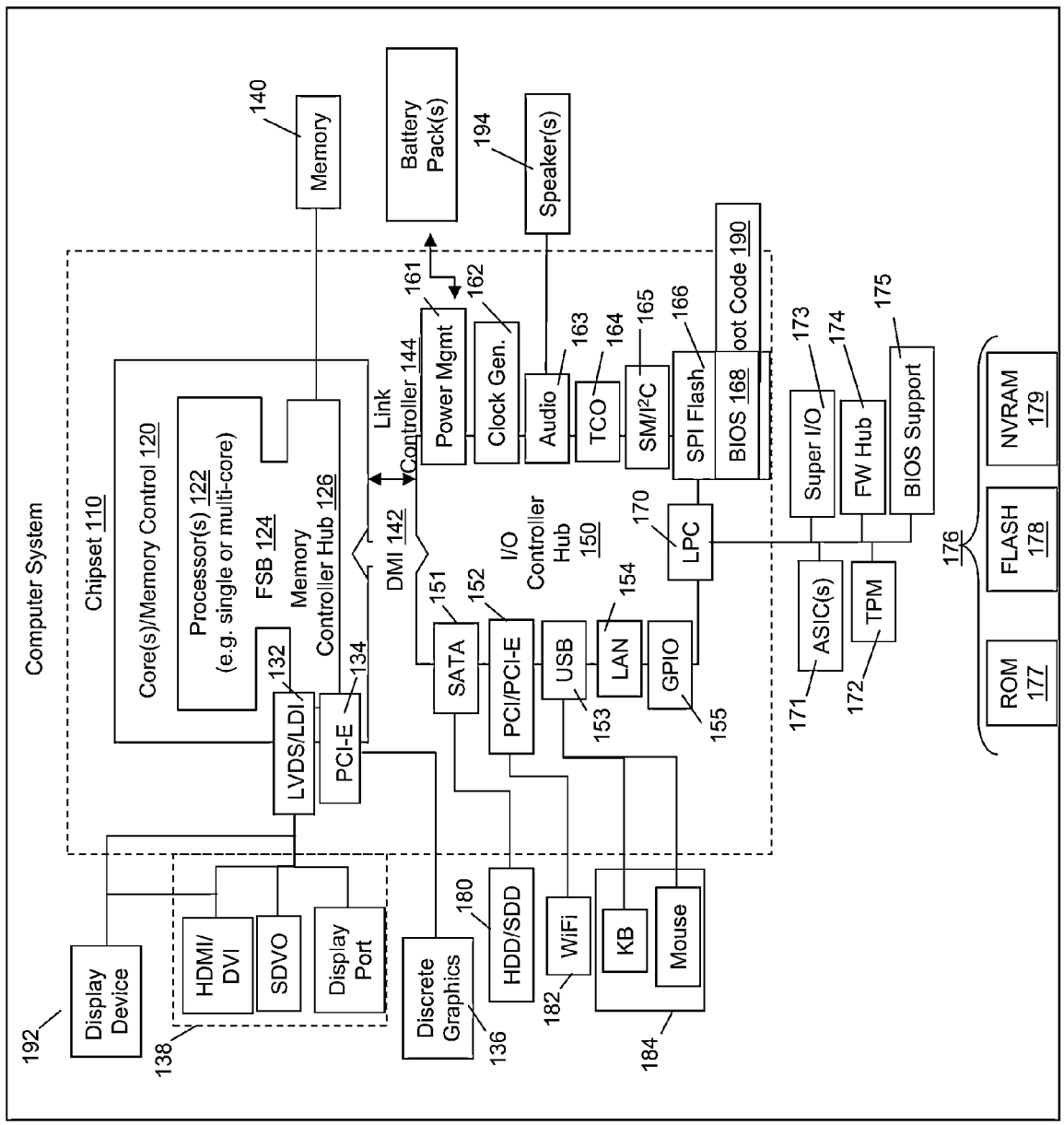
FIG. 1 illustrates an example information handling device and components thereof.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

A pouch type cell (or simply pouch cell) is any cell having a soft or flexible exterior for containing the battery cell(s). Advantages of pouch cells include cost savings and size reduction. A pouch cell may comprise one or more battery cells. A pouch cell, desirable for slim or thin device implementations, comprises one or more battery cells housed for example within a flexible foil material, rather than a rigid or hard material, e.g., metal. The electrical contacts include foil tabs, which are welded to the pouch cell's electrodes. Pouch cells are widely utilized in many electronic devices, for example tablet computing devices, smart phones, MP3 players, and the like.

Pouch cells suffer from a difficulty related to swelling. Swelling may result in response to gas build up within the sealed pouch responsive to various conditions, causing the sealed pouch to swell (due to its flexible, non-rigid construction), similar to a balloon or a pillow. A common cause of such swelling is over discharge, and this swelling becomes increasingly likely as the pouch cell ages. Given that pouches are typically included in sealed devices or confined spaces, swelling of the pouch cell may not only cause damage to the pouch cell itself, but may harm surrounding components due to the pouch cell swelling and imparting physical damage to sensitive components of electronic devices.

Accordingly, an embodiment provides for active prevention of pouch cell swelling. An embodiment employs an intelligent discharge mechanism that allows a pouch cell to actively discharge in order to avoid swelling. An embodiment therefor provides active avoidance of potentially harmful swelling conditions.

The illustrated example embodiments will be best understood by reference to the figures. The following description is intended only by way of example, and simply illustrates certain example embodiments.

Figure 2:
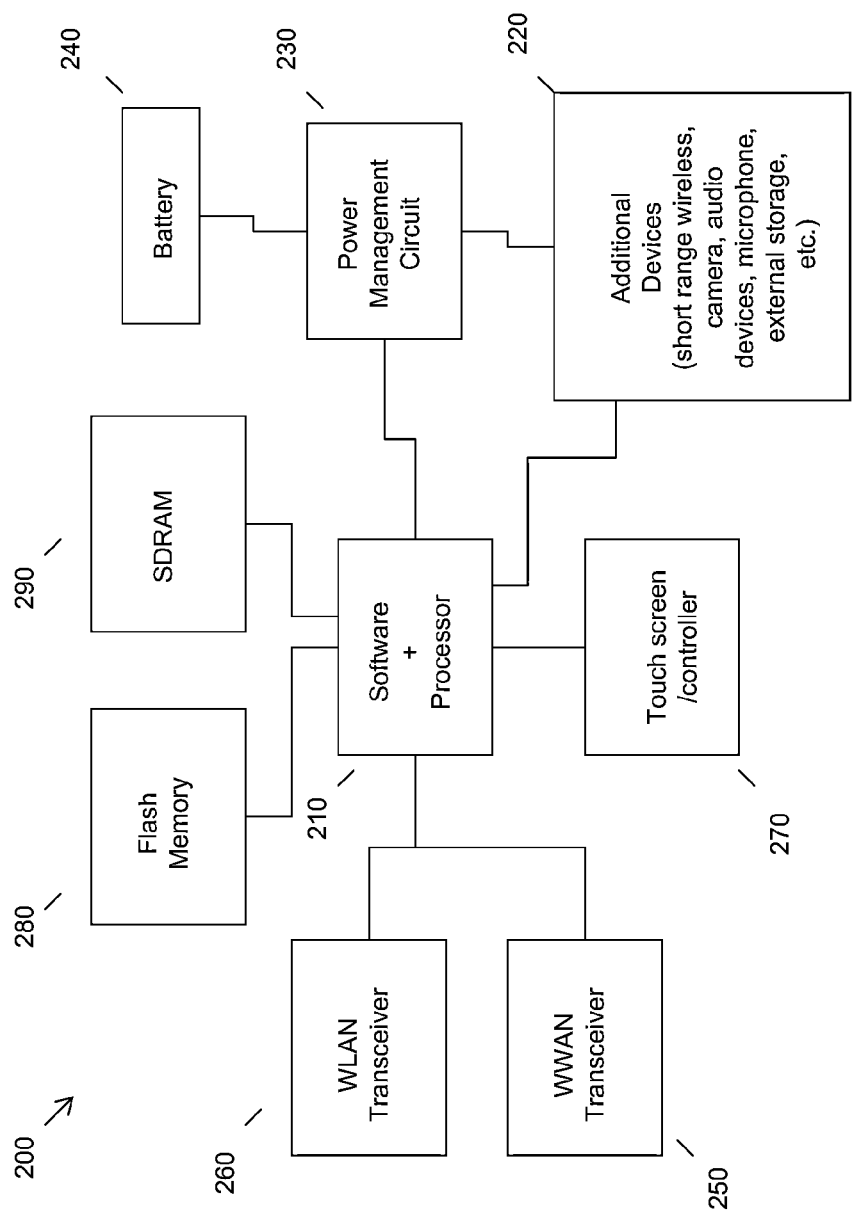
FIG. 2 illustrates another example information handling device and components thereof.

Referring to FIG. 1 and FIG. 2, while various other circuits, circuitry or components may be utilized, with regard to smart phone and/or tablet circuitry 200, an example illustrated in FIG. 2 includes an ARM based system (system on a chip) design, with software and processor(s) combined in a single chip 210. Internal busses and the like depend on different vendors, but essentially all the peripheral devices (220) may attach to a single chip 210. In contrast to the circuitry illustrated in FIG. 1, the tablet circuitry 200 combines the processor, memory control, and I/O controller hub all into a single chip 210. Also, ARM based systems 200 do not typically use SATA or PCI or LPC. Common interfaces for example include SDIO and I2C.

There are power management chip(s) 230, e.g., a battery management unit, BMU, which manage power as supplied for example via a rechargeable battery 240, which may be a pouch cell type battery that is recharged by a connection to a power source (not shown). In at least one design, a single chip, such as 210, is used to supply BIOS like functionality and DRAM memory.

ARM based systems 200 typically include one or more of a WWAN transceiver 250 and a WLAN transceiver 260 for connecting to various networks, such as telecommunications networks and wireless base stations. Commonly, an ARM based system 200 will include a touch screen 270 for data input and display. ARM based systems 200 also typically include various memory devices, for example flash memory 280 and SDRAM 290.

FIG. 1 depicts a block diagram of one example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, which may be used in connection with managing battery cells (including pouch type cells), a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Information handling devices, as for example outlined in FIG. 1 and FIG. 2, may include pouch cells or packs that are integral thereto and used to supply power. The pouch cells supply power to system components for executing various tasks. The pouch cells are rechargeable and afford mobility to the unit (i.e., provide for operation when the device is not connected to a commercial power source). An embodiment provides power management capabilities for discharging the pouch cells in an intelligent fashion such that the occurrence of a potentially damaging swelling condition is minimized.

Figure 3:
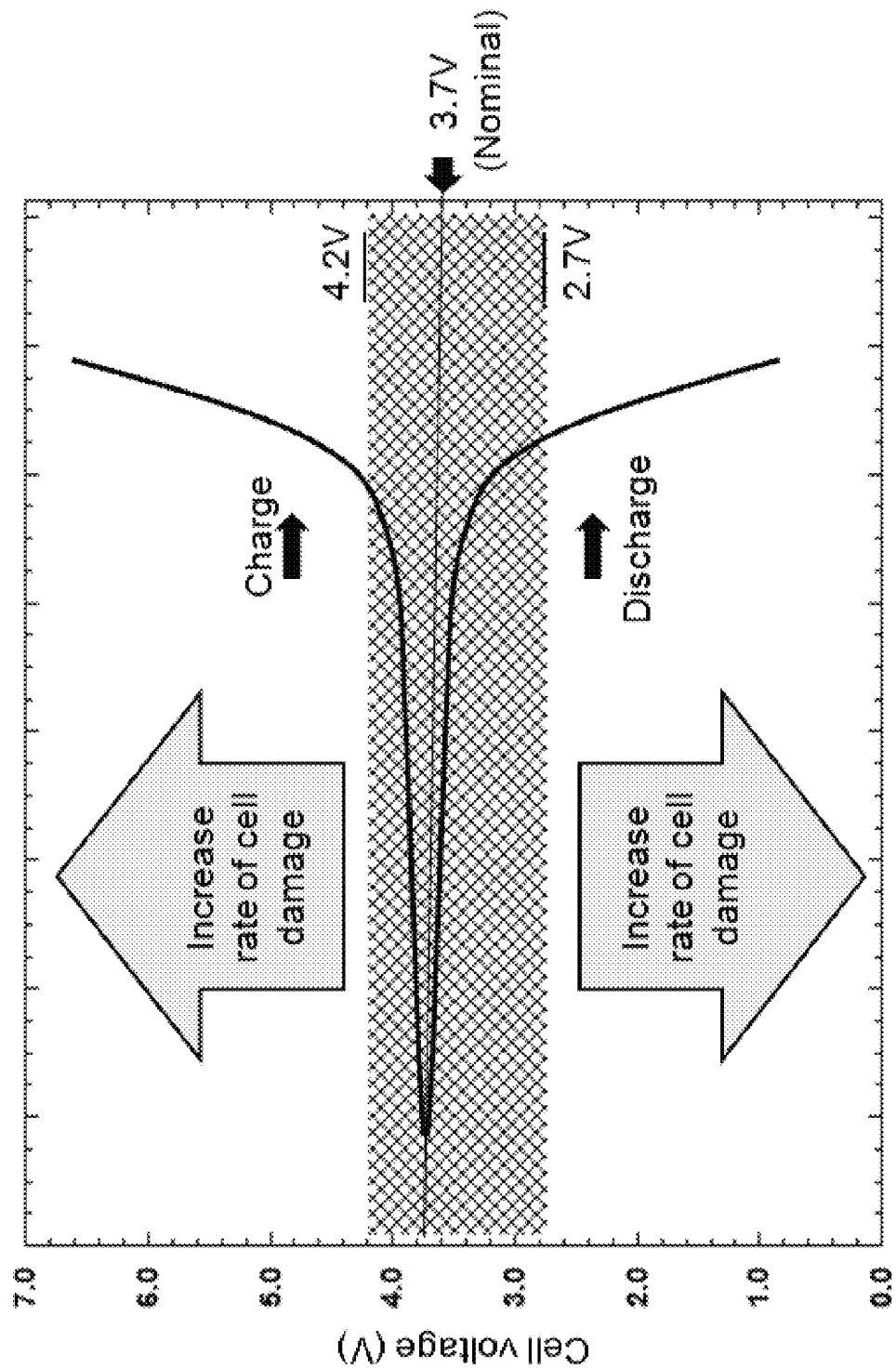
FIG. 3 illustrates a voltage range of operation for a battery cell.

Referring to FIG. 3, in a pouch cell, a BMU (or processor and memory and/or circuit with like functionality) will control the particular cell's voltage to be maintained within a narrow range. In the example of FIG. 2, the cell is maintained between 3.7V and 4.2V. The BMU controls charging and discharging (cycling) of the cell(s) of a pouch cell. Thus, when the cell is fully charged, the BMU will stop charging the cell, and when the cell reaches a lower threshold, the BMU will indicate that the cell must be recharged prior to further discharge. In this way, the BMU is configured to control operation of the cell and maintain it within an acceptable/normal voltage range.

When a cell reaches a lower cell threshold ("cut-off" threshold), here 2.7V, the BMU acts to cut off the cell from further charging/discharging as a safety measure. This is done to prevent certain conditions from occurring within the cell (e.g., deposition, which will depend on the cell's chemistry). However, at this point (e.g., a cell below 2.7V in the example of FIG. 2), the cell naturally continues to lose charge over time, even though the BMU has cut off the cell as a safety measure.

It turns out that over discharge (below a certain threshold voltage) is a condition that gives rise to swelling in pouch cells. More problematically, at this point the BMU has cut off the cell, so the cell continues to lose charge slowly over time and begins to swell, causing damage to surrounding components, and cannot be controlled by the BMU. Even more problematically, the slower that the cell loses charge, the worse the swelling becomes.

Figure 4:
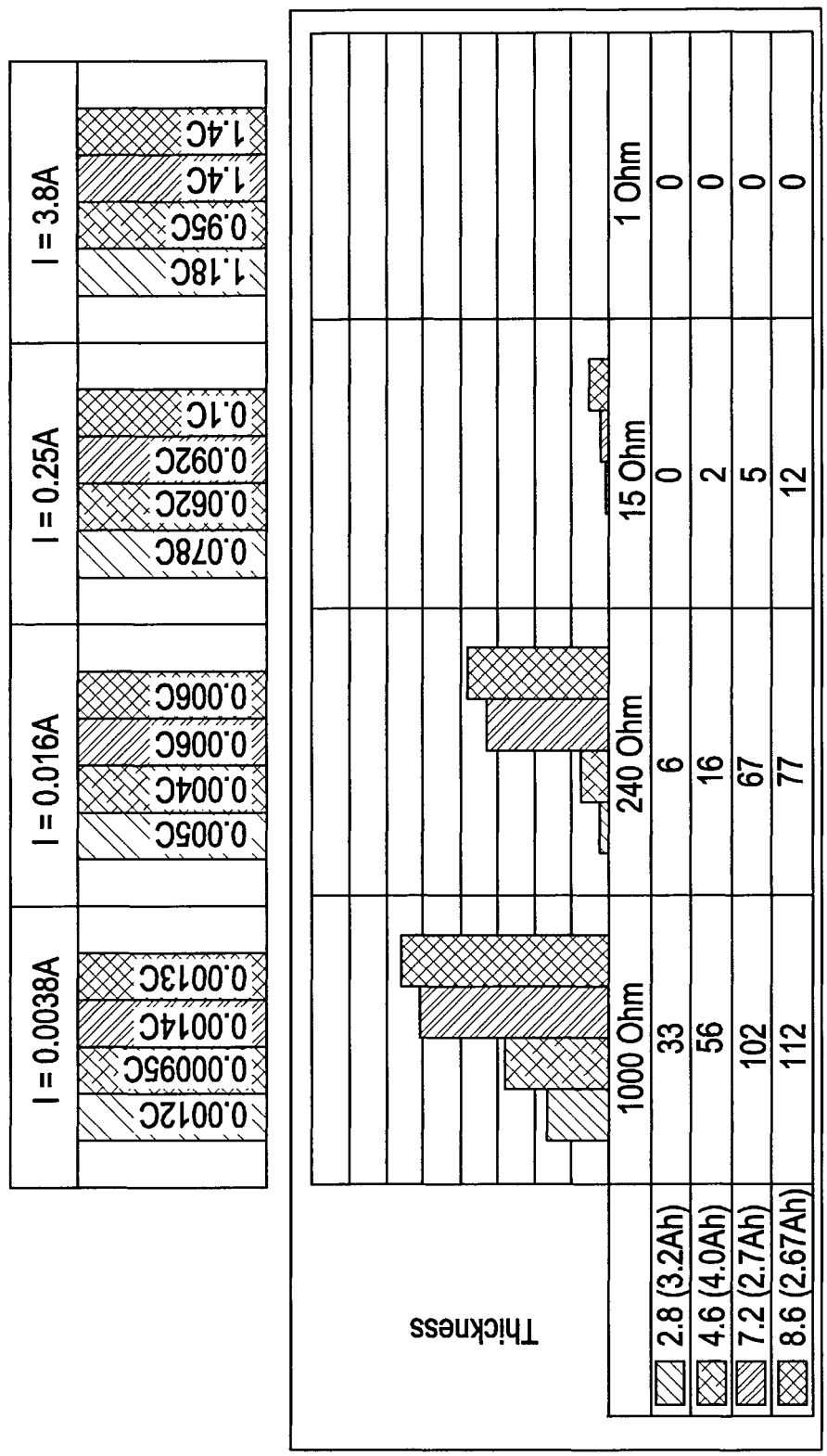
FIG. 4 illustrates examples of pouch cell thickness versus discharge rate for a fresh cell.
Figure 5:
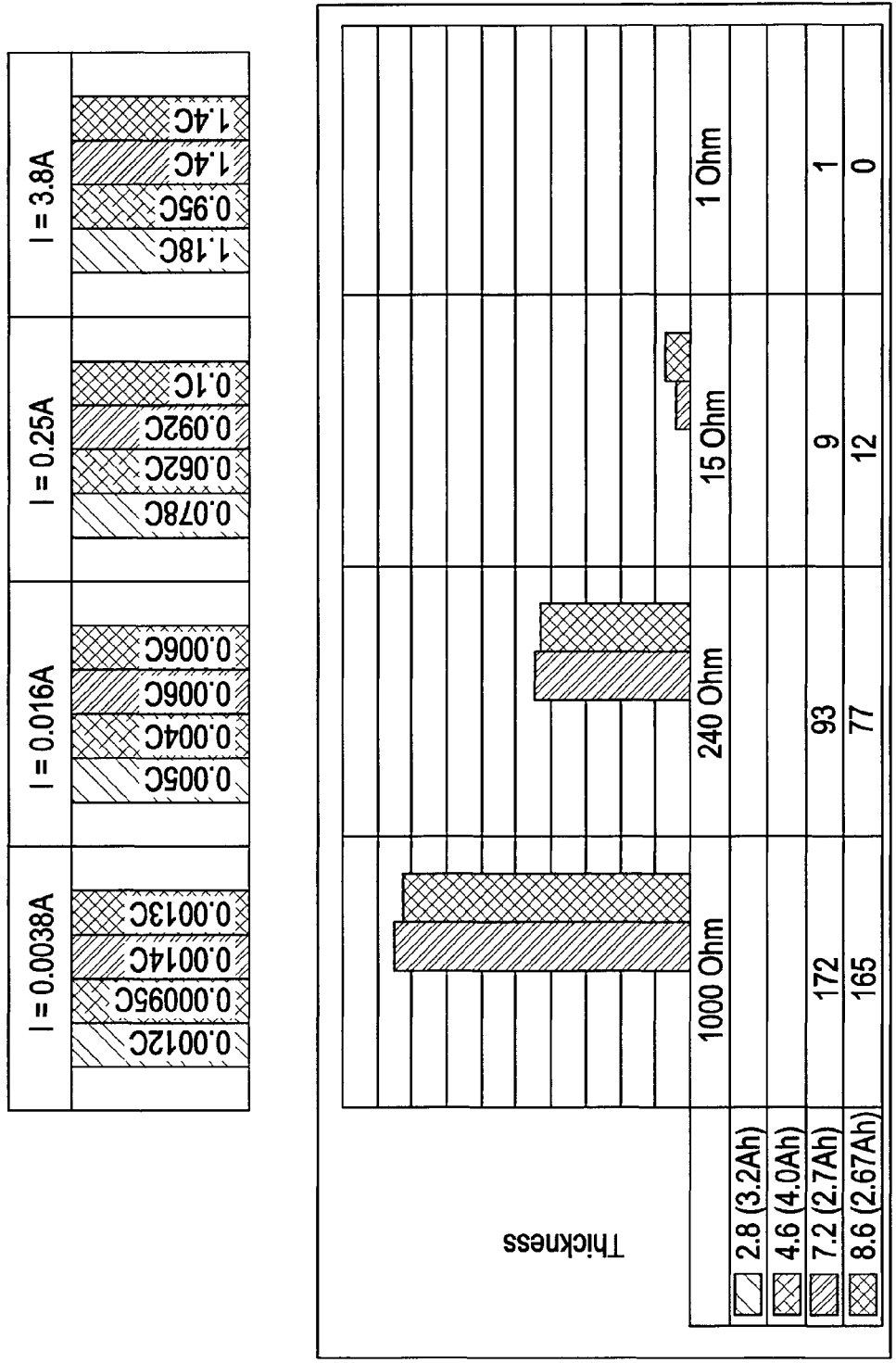
FIG. 5 illustrates examples of pouch cell thickness versus discharge rate for a cycled cell.

As illustrated in FIG. 4 (for a fresh cell), the more slowly the cell loses charge, the worse the swelling is. FIG. 4 illustrates experimental data where different pouch cells have had their charge drained at varying rates (via attachment of different resistors) and their thickness monitored. As indicated in the illustration of FIG. 4, the cells that drain the slowest (highest resistance) have the worst swelling. The inverse is also observed, i.e., with increased discharge, the pouches do not swell as much, with a minimum or no swelling seen for the quickest discharge. FIG. 5 illustrates commensurate experimental data for cells that have undergone ~1000 charge/discharge cycles.

Figure 6:
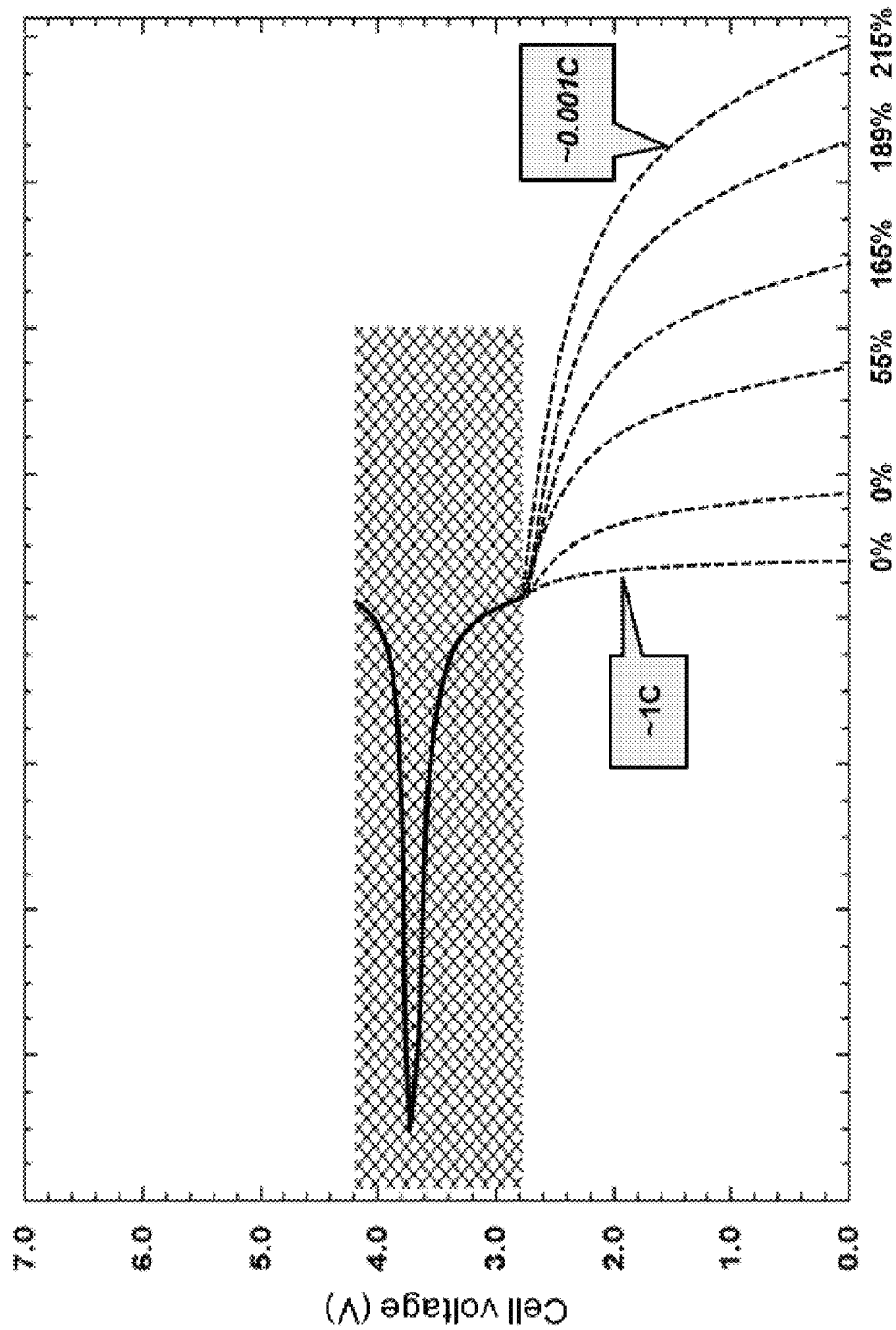
FIG. 6 illustrates examples of cell thickness versus discharge rate responsive to active discharge initiation.
Figure 7:
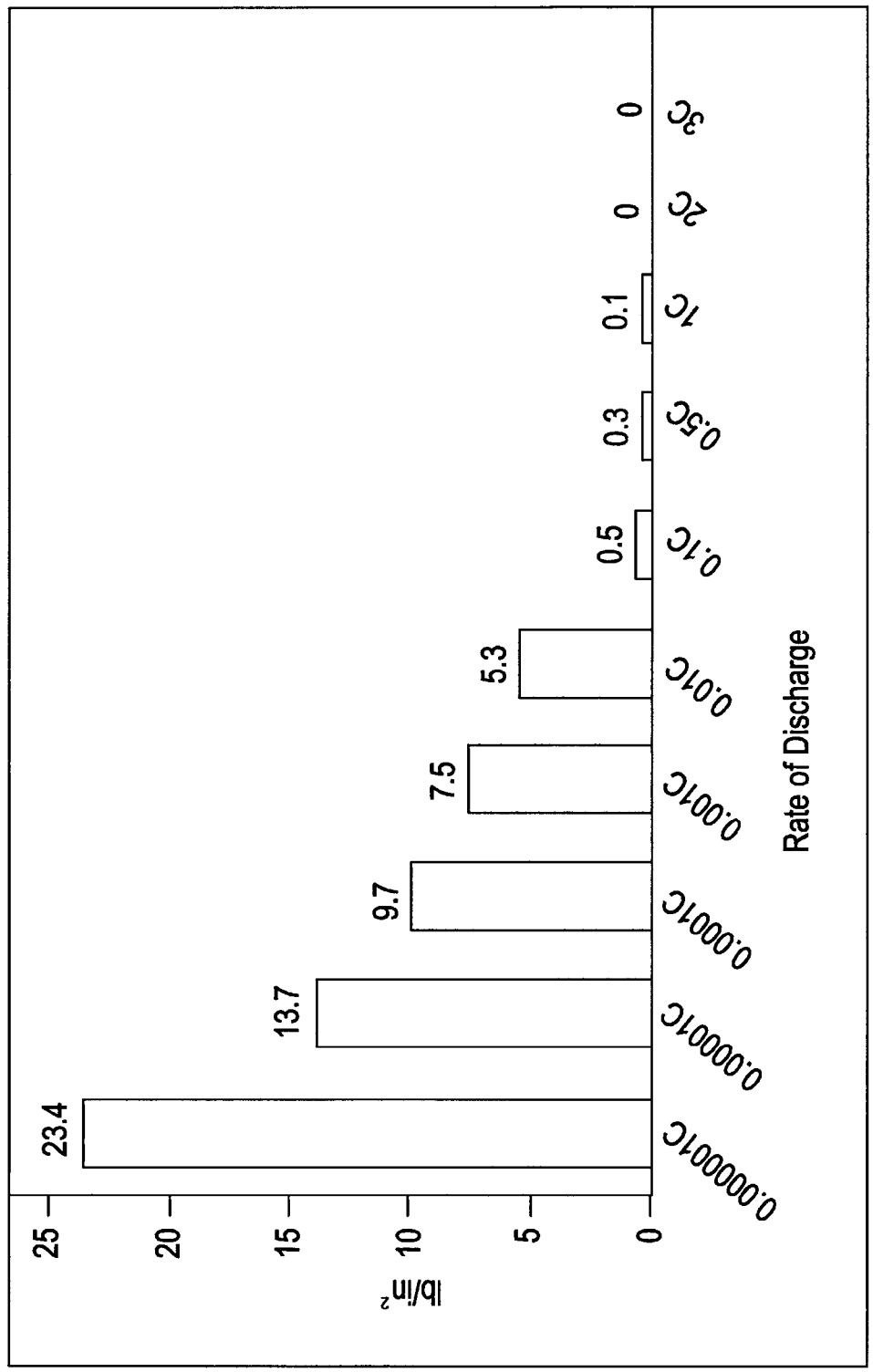
FIG. 7 illustrates examples of cell pressure for varying discharge rates.

FIG. 6 illustrates some experimental data for swelling in pouch cells that have been subjected to different active discharge rates. Again, it is observed that more quickly discharging a pack (e.g., at 1 C versus 0.001 C) leads to reduced pouch thickness or swelling. FIG. 7 illustrates commensurate data relating to internal pouch pressure (lb/in$^2$). As illustrated, less pressure (which results in swelling) is observed with higher discharge rates, with certain discharge rates (e.g., 0.1 C and greater) yielding no appreciable pressure increase.

Figure 8:
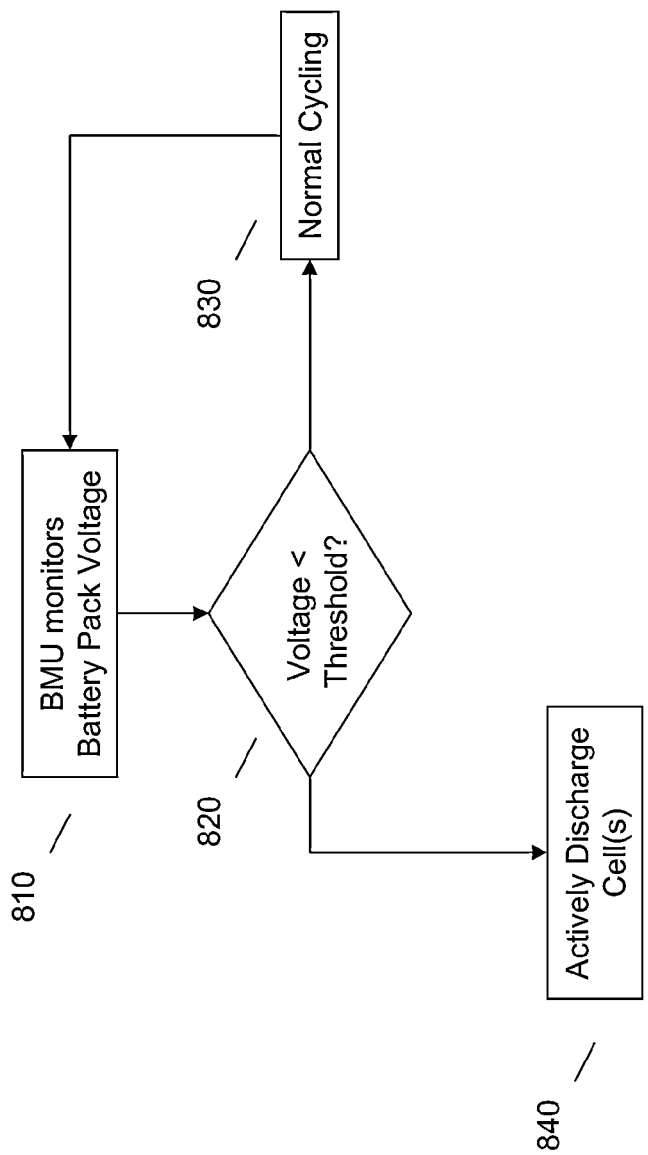
FIG. 8 illustrates an example method for active pouch cell discharge.

Accordingly, an embodiment employs active discharging to avoid a swelling condition for pouch cell(s). As illustrated in FIG. 8, a BMU monitors a pouch cell (in the usual manner). At 820, if the BMU determines that an extreme lower threshold (e.g., 2.7V, which will depend on the particular cell(s) in question) has not been yet been reached, normal charging and discharging (cycling) may be maintained 830, with monitoring by the BMU. That is, the battery is operating normally and may continue to be charged/discharged.

However, if it is determined by the BMU that a lower threshold has been passed, e.g., 2.7V, rather than cutting off the cell (as conventionally is done), the BMU will initiate active discharging of the cell at 840. This again provides the cells with active reduction in voltage (active discharging), which has been found to prevent swelling. The active discharging may be implemented in a variety of ways. For example, the BMU (or like circuitry) may connect the cell(s) in question to discharge lines having predetermined resistances in order to draw off the remaining charge of the cell(s) in a controlled manner, e.g., via use of a silicon controlled rectifier (SCR) or the equivalent. Example resistances are provided in the figures, although these may vary depending on the particular cell(s) in use.

As the battery (pouch cell) is already unusable (i.e., it cannot be charged/discharged after obtaining a voltage below a certain lower threshold), no particular loss results from the active discharging. At this point, the customer is resigned to changing the pouch cell, although the system may continue to operate normally (e.g., using outlet power and/or additional battery packs/pouches).

However, a benefit of active discharging a pack that has achieved a "cut off" threshold is that it allows the system to avoid pouch swelling in that pack, which may be catastrophic to the system as a whole. This is because if the cell(s) is/are allowed to slowly lose charge, swelling is magnified (as described herein in connection with FIG. 4 through FIG. 6). Such swelling, particularly in confined spaces, such as in small form factors, may lead to pressure application on delicate system components, leading to the destruction of the system.

Thus, an embodiment employs active discharge for the management of pouch cell swelling. An embodiment ensures that a pouch cell that has achieved a certain state (e.g., reduced voltage below a threshold) is actively discharged to prevent potential swelling and system damage. In this way, a pouch cell that has reached its useful limit is drawn down in a controlled manner, avoiding further system damage.

It should be understood and appreciated that battery cells, as discussed and broadly contemplated herein, can be employed in any of a very wide variety of operating environments, including computers, cell phones, other mobile devices (such as personal digital assistants or PDA's), automobiles, and power tools (such as battery-operated power drills, saws, mowers and weed cutters). Thus, while FIG. 1 and FIG. 2 present information handling devices by way of a possible operating environment for a battery cell in accordance with an embodiment of the present invention, it of course should be understood that this is provided by way of an illustrative and non-restrictive example. Battery cells, as such, can act to power a load device or other item that is configured for being battery powered. In the case of an information handling device, a battery cell can serve to power various components including a main memory while in the case of an automobile a battery cell can serve to power an electric motor which propels motion of the automobile.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the functions/acts specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   normally discharging one or more battery cells housed in a flexible exterior material;
   determining one or more of the one or more battery cells has less than a predetermined voltage level; and
   actively discharging the one or more battery cells determined to have less than the predetermined voltage wherein the determining one or more battery cells have less than a predetermined voltage level and actively discharging the one or more battery cells determined to have less than the predetermined voltage are performed at least in part using a battery management unit.

2. The method of claim 1, wherein the predetermined voltage corresponds to a lower cut off voltage.

3. The method of claim 1, wherein the step of actively discharging further comprises actively discharging the one or more battery cells at a predetermined rate.

4. The method of claim 3, wherein the predetermined rate comprises a rate of about 0.1 C to 2 C.

5. The method of claim 1, wherein the step of actively discharging further comprises discharging the one or more battery cells via connecting the one or more cells to a discharge line having a predetermined resistance.

6. The method of claim 5, wherein the predetermined resistance comprises a resistance of about 240 Ohms or less.

7. The method of claim 5, wherein the predetermined resistance comprises a resistance of about 15 Ohms or less.

8. The method of claim 1, wherein the steps of determining one or more of the one or more battery cells has less than a predetermined voltage level and actively discharging the one or more battery cells determined to have less than the predetermined voltage are performed at least in part using a system processor.

9. A system comprising:
   a flexible exterior material containing one or more battery cells;
   one or more components deriving power from the one or more battery cells a battery management unit;
   one or more processors; and
   a memory operatively coupled to the one or more processors that stores instructions executable by the one or more processors to perform acts comprising:
   normally discharging the one or more battery cells;
   determining one or more of the one or more battery cells have less than a predetermined voltage level; and
   actively discharging the one or more battery cells determined to have less than the predetermined voltage wherein the determining the one or more battery cells have less than a predetermined voltage level and actively discharging the one or more battery cells determined to have less than the predetermined voltage are performed at least in part using the battery management unit.

10. The system of claim 9, wherein the predetermined voltage corresponds to a lower cut off voltage.

11. The system of claim 9, wherein the act of actively discharging further comprises actively discharging the one or more battery cells at a predetermined rate.

12. The system of claim 11, wherein the predetermined rate comprises a rate of about 0.1 C to 2 C.

13. The system of claim 9, wherein the act of actively discharging further comprises discharging the one or more battery cells via connecting the one or more cells to a discharge line having a predetermined resistance.

14. The system of claim 13, wherein the predetermined resistance comprises a resistance of about 240 Ohms or less.

15. The system of claim 13, wherein the predetermined resistance comprises a resistance of about 15 Ohms or less.

16. The system of claim 9, wherein the acts of determining one or more of the one or more battery cells has less than a predetermined voltage level and actively discharging the one or more battery cells determined to have less than the predetermined voltage are performed at least in part using the one or more processors.

17. The system of claim 9, wherein:
    said system comprises an automobile;
    said one or more components deriving power from the one or more battery cells comprises an electric motor which propels motion of said automobile; and
    said one or more battery cells act to provide power to said electric motor.

18. The system of claim 9, wherein:
    said system comprises a mobile information handling device;
    said one or more components deriving power from the one or more battery cells comprise mobile information handling device components; and
    said one or more battery cells act to provide power to said one or more components.

19. A program product, comprising:
    a non-transitory storage medium having computer program code embodied therewith, the computer program code comprising:
    computer program code that normally discharges one or more battery cells housed in a flexible exterior material;

computer program code that determines one or more of the one or more battery cells have less than a predetermined voltage level; and computer program code to that actively discharges the one or more battery cells determined to have less than the predetermined voltage wherein the computer program code that determines one or more battery cells have less than a predetermined voltage level and the computer program code that actively discharges the one or more battery cells determined to have less than the predetermined voltage are performed at least in part using a battery management unit.

* * * * *